United States Patent [19]
Duran

[11] Patent Number: 5,394,594
[45] Date of Patent: Mar. 7, 1995

[54] BALL LOCKING DEVICE WITH INTERCHANGEABLE HANDLES

[75] Inventor: John A. Duran, Glendora, Calif.

[73] Assignee: Avibank Mfg., Inc., Burbank, Calif.

[21] Appl. No.: 88,854

[22] Filed: Jul. 7, 1993

[51] Int. Cl.⁶ ............................................ F16B 19/00
[52] U.S. Cl. ........................................ 24/453; 24/607;
403/33; 403/321; 403/325; 403/328; 411/348;
16/114 R
[58] Field of Search ............... 403/17, 33, 321, 322,
403/324, 325, 327, 328, DIG. 6; 24/453, 607;
411/348; 81/177.1, 489, 900; 16/114 R

[56] References Cited

U.S. PATENT DOCUMENTS

| | | | |
|---|---|---|---|
| 2,373,083 | 4/1945 | Brewster | 411/348 |
| 3,101,641 | 8/1963 | Walker et al. | 411/348 |
| 3,117,484 | 1/1964 | Myers | 411/348 |
| 3,534,650 | 10/1970 | Kubokawa | 24/453 |
| 3,596,554 | 8/1971 | Othman et al. | 24/453 |
| 3,948,549 | 4/1976 | Duran | 292/26 |
| 4,404,714 | 9/1983 | Duran | 24/652 |
| 4,792,255 | 12/1988 | McArthur et al. | 403/322 |

FOREIGN PATENT DOCUMENTS

| | | | |
|---|---|---|---|
| 853398 | 11/1960 | United Kingdom | 24/453 |
| 957177 | 5/1964 | United Kingdom | 24/453 |

Primary Examiner—Edward K. Look
Assistant Examiner—James A. Larson
Attorney, Agent, or Firm—Poms, Smith, Lande & Rose

[57] ABSTRACT

A ball locking device having a ball locking mechanism releasably attachable to a receptacle to lock the device thereto until released. The device has a handle which is removably attached to the device so that the handle can be changed for another. The handle may be of a non-metallic material whereas the main components of the ball locking mechanism may be of metallic material.

9 Claims, 2 Drawing Sheets

BALL LOCKING DEVICE WITH INTERCHANGEABLE HANDLES

OF THE INVENTION

1. Field of the Invention

The invention relates to ball locking devices; and, more particularly, a ball locking device having interchangeable handles.

2. Description of the Prior Art

Quick connect ball locking devices are well known in the prior art. Such devices generally include a plurality of detents, such as balls, trapped within a tube but protruding out openings therein. A ball actuator is reciprocal within the tube and movable from a first position wherein the balls are retracted substantially within the tube or moved outwardly a sufficient distance to lock the balls within a mating receptacle.

Generally, such prior art ball locking devices have a stainless steel head integral with the actuating member (generally of one-piece).

In use, such devices generally have differing heads or handle portions, or even different colored handles, depending upon the application, use or desire of the customer. However, the actuating mechanism, i.e., the tube, balls and actuating member portion, are the same regardless of the configuration of the head or handle portion.

There is a need for an improved ball locking device that can be quickly and easily assembled from stock resulting in a device having a head or handle portion to the customer's specifications. This would cut down on inventory and provides faster delivery to the customer.

SUMMARY OF THE INVENTION

It is an object of this invention to provide a ball locking device having interchangeable handles.

These and other objects are preferably accomplished by providing a ball locking device having a ball locking mechanism adapted to be releasably attachable to a receptacle to lock the device thereto until released. The device has a handle which is removably attached to the device so that the handle can be changed for another. The handle may be of a plastic material while the locking mechanism may be of metal.

DESCRIPTION OF THE PREFERRED EMBODIMENT

Figure 1:
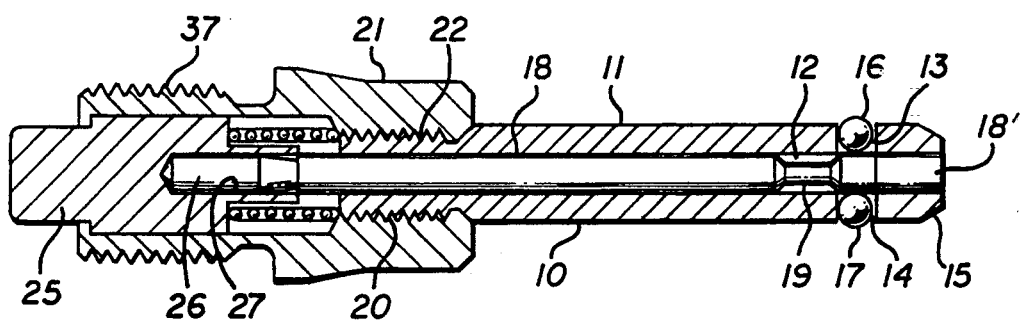
FIG. 1 is an elevational sectional view of a locking pin in accordance with the teachings of the invention.

Referring to FIG. 1 of the drawing, a locking pin 10 is shown having an elongated generally cylindrical barrel 11 with a throughbore 12. A plurality of spaced openings 13, 14, such as two, are provided through barrel 11 adjacent one end 15 thereof. A plurality of detents, such as balls 16, 17, are provided in openings 13, 14. The areas of barrel 11 surrounding openings 13, 14 may be peened, as is well known in the art, to retain balls 16, 17 in openings 13, 14.

An elongated ball, actuator 18 is reciprocally mounted in throughbore 12. Actuator 18 has a head 18' and reduced diameter section 19 into which balls 16, 17 may move which actuator 18 is moved to the right in FIG. 1. This allows balls 16, 17 to be disposed within barrel 11 of sufficient distance to release pin 10 from a receptacle (not shown) as is well known in the ball locking art.

Figure 2:
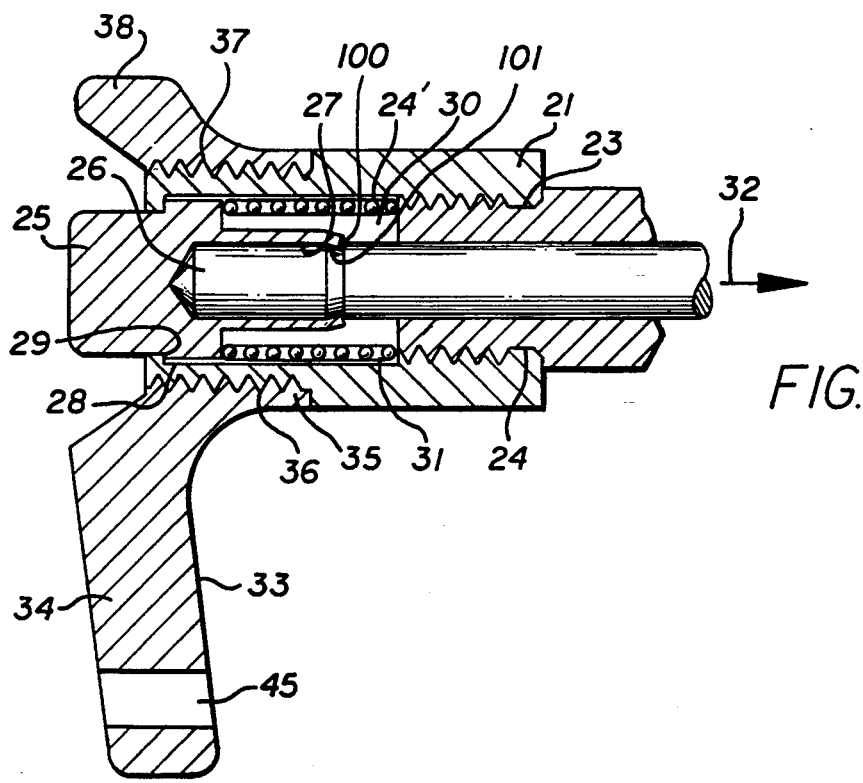
FIG. 2 is a detailed sectional view of a portion of the pin of FIG. 1 showing one type of handle installed thereon.

Barrel 11 terminates at the end opposite end 15 in a threaded end 20. An enlarged head 21 is fastened to end 20 in any suitable manner, such as by knurling the same, or by thread means. Thus, as seen in FIG. 1, head 21 is secured by threading having internal mating threads 22. As seen in FIG. 2, end 20 of barrel 11 has an annular groove 23 adjacent end 20 adapted to receive therein an annular flange 24 on head 21 forming by swaging the same into areas 23. In addition, enlarged head 21 has means for retaining the same to a handle, such as handle 33 (FIG. 2). In the embodiment shown, threads 37 are used to secure head 21 to handle 33 but other means, such as knurling, may be used.

Actuator 18 extends through a chamber 24' in head 21 to a push button 25. End 26 of actuator 18 is thus press-fit into a hole 27 in push button 25. Push button 25 being retained to head 21 by engagement of annular flange 28 with shoulder 29 of head 21 as shown. In lieu of a preformed shoulder 29, formed by counterboring head 21, the terminal end of head 21 may be swaged inwardly to provide a stop or shoulder. Actuator 18 is secured to push button 25 by swaging end 100 of push button 25 into groove 101 as seen in FIG. 2. This swaging operation retains push button 25 to spindle end of actuator 18.

Figure 3:
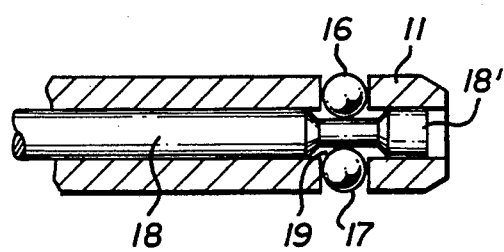
FIG. 3 is a detailed sectional view of a portion of the pin of FIG. 1 showing the same in a ball unlocking position.

A chamber 30 is formed internally of pin 10 between push button 25 and barrel 11. A coil spring 31 is disposed within chamber 30 abutting against push button 25 and barrel 11 normally biasing push button 25 away from barrel 11. When push button 25 is pushed internally against the bias of spring 31, actuator 18 is moved in the direction of arrow 32 in FIG. 2. As seen in FIG. 3, this moves reduced diameter section 19 to the right in FIG. 1 allowing balls 16, 17 to move back into barrel 11 in the release position shown in FIG. 3.

Head 21, barrel 11 and push button 25 may be made of stainless steel and head 21 is integral with barrel 11 either by being threaded or otherwise swaged or knurled thereto or integral therewith.

An actuating handle, such as L-shaped handle 33 (FIG. 2) may be secured to push button 25. Handle 33 has a first elongated gripping portion 34 extending from a center portion 35 having a central threaded aperture 36. Enlarged head 21 has mating threads 37 on the outside thereof threadably mating with threaded aperture 36. A shorter gripping portion 38 extends from center portion 35 on the side thereof opposite gripping portion 34. If desired, a hole 45 may be provided in portion 34 for securing a strap or the like (not shown) thereto.

Thus, an operator can grip portions 34, 38 and push inwardly on push button 25 thereby moving actuator 18 as heretofore discussed.

Thus, handle 33 may be made of plastic and/or may be color coded. By threading it to head 21, it can be quickly and easily removed therefrom. The stainless steel head 21 integral with stainless steel barrel 11 carries the tension loads and allows the use of plastic handles which may be color coded. The use of plastic cuts down on costs and a desired color can be molded into the handle 33 during the manufacturing process. This eliminates a secondary process, such as cadmium plating or anodizing, necessary in making such locking pins heretofore, which processes pollute the environment. Thus, colored handles, needed to coordinate with a customer's application, can be molded in the handle. Such coloring is also aesthetically appealing.

Figure 4:
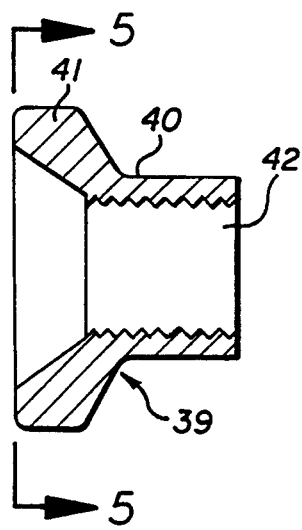
FIG. 4 is a vertical sectional view of another type of handle which can be installed on the pin of FIG. 1.
Figure 5:
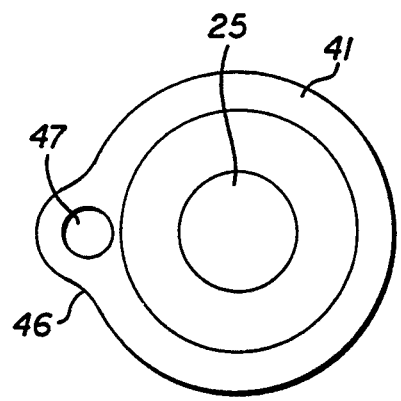
FIG. 5 is a view taken along lines 5—5 of FIG. 4.

Although a particular handle 33 is shown in FIG. 2, other handles may be interchangeably threaded on to head 21. Thus, as seen in FIG. 4, a button handle 39 may have a generally cylindrical main body portion 40 having an outer enlarged annular gripping portion 41 and a threaded throughbore 42. The threads of throughbore 42 mate with threads 37 of enlarged head 21 which, when handle 39 is threaded thereto, extends outwardly thereof similar to the orientation of handle 33 and push button 25 in FIG. 2. As seen in FIG. 5, an extension portion 46 may be integral with gripping portion 41 having hole 47 therethrough for receiving a strap or the like (not shown).

Figure 6:
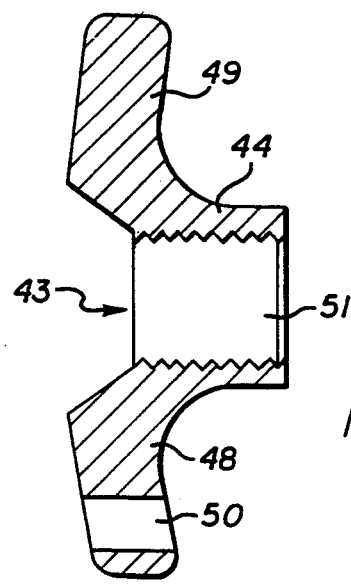
FIG. 6 is a vertical sectional view of still another type of handle which can be installed on the locking pin of FIG. 1.

Another handle 43 in the form of a T is shown in FIG. 6. Handle 43 has a central generally cylindrical main body portion 44 and integral elongated gripping portions 48, 49 extending outwardly on each side thereof. A hole 50 may be provided in one of the gripping portions, such as portion 48, for receiving a strap or the like (not shown) therein. Main body portion 44 has a threaded throughbore 51 adapted to mate with threads 37 of enlarged head 21 as heretofore discussed with respect to handles 33 and 39.

Figure 7:
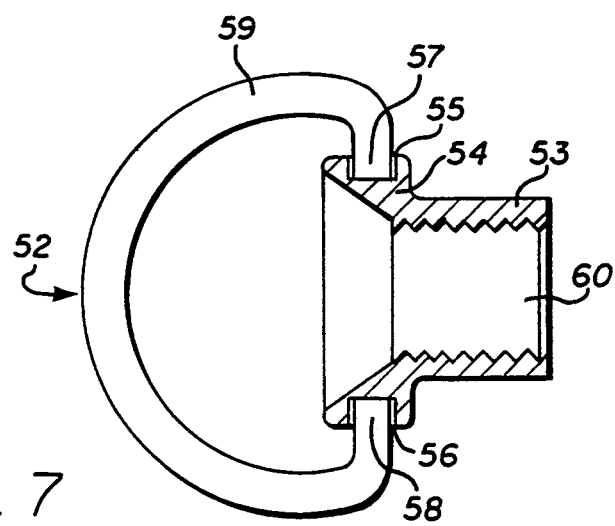
FIG. 7 is a vertical cross-sectional view of a fourth modification of a handle which can be installed on the locking pin of FIG. 1.

Still another handle 52 is shown in FIG. 7. Handle 52 has a generally cylindrical main body portion 53 with an outer annular integral flange 54. Flange 54 has a pair of opposed holes 55, 56 receiving therein legs 57, 58, respectively, of a gripping ring 59. Ring 59 is of a resilient material, such as wire, and legs 57, 58 snap fit into holes 55, 56. A threaded throughbore 60 extends through main body portion 53 and flange 54 adapted to mate with threads 37 of head 21 as heretofore discussed. Obviously, a strap or the like (not shown) can be secured directly to ring 59. Ring 59 can be grasped while pushing on push button 25 when handle 52 is assembled thereto as heretofore discussed.

It can be seen that the handles of FIGS. 2, 4, 5, and 7 can be quickly and easily interchanged. All of the handles can be made of plastic and colored as heretofore discussed. This cuts down on inventory and allows quick delivery to the customer.

Although ball locking devices of the type discussed herein have many uses, they are particularly useful as quick release mechanisms in the aircraft industry such as the mechanisms disclosed in my U.S. Pat. Nos. 3,948,549 and 4,404,714. These patents, commonly assigned, and the teachings of which are incorporated herein by reference, disclose similar ball locking pins adapted to releasably engage locking receptacles, such as receptacle 73 in wall 74 of U.S. Pat. No. 3,948,549, and keeper pins, such as pin 14 of U.S. Pat. No. 4,404,714.

Although a particular embodiment of the invention has been disclosed, variations thereof may occur to an artisan and the scope of the invention is only to be limited by the scope of the appended claims.

I claim:

1. A detent locking device comprising:
   a barrel having a throughbore, said barrel having at least a pair of openings adjacent one end thereof communicating the interior of said throughbore with the exterior of said barrel;
   a head secured to the other end of said barrel having a main body portion and an integral threaded portion about the exterior thereof, a shoulder on the exterior of said head separating said last mentioned main body portion and said integral threaded portion, said head being integral with said barrel and both said barrel and said head being of a metallic material;
   a detent actuator reciprocally mounted in said throughbore having one end secured to a push button mounted in a throughbore in said head and the other end having a reduced diameter portion adjacent said openings, said push button being normally spaced from said barrel thereby forming a chamber defined by the inner wall of said head, said push button and said barrel and surrounding said actuator;
   a detent disposed in each of said openings, each of said detents being disposed substantially within said openings and in said reduced diameter portion when said actuator is in a first unlocking position and extending outwardly of said barrel away from said reduced diameter portion when said actuator is in a second locking position;
   a coiled spring disposed in said chamber abutting at one end against said push button and at the other end against said barrel whereby said push button can be pushed to move said actuator to said first unlocking position against the bias of said spring, said spring returning said actuator to its second locking position when said push button is released; and
   a removable handle of a non-metallic material having a main body portion with an inner threaded bore of a length related to the length of said threaded portion about the exterior of said head threadably mounted to the threaded portion of said head and abutting against said shoulder, said main body portion of said handle having a gripping portion integral therewith, the length of said barrel between said head and said one end of said barrel being non-adjustable and fixed in length.

2. In the device of claim 1 wherein said head and said barrel are of stainless steel and said handle is of a plastic material.

3. In the device of claim 2 wherein said handle is of a color molded into said plastic material.

4. In the device of claim 1 wherein said detents are balls.

5. In the device of claim 1 wherein said barrel is peened about the areas surrounding said openings.

6. In the device of claim 1 wherein said gripping portion is L-shaped.

7. In the device of claim 1 wherein said gripping portion includes an annular flange integral with said main body portion having a throughbore communicating with said threaded bore in said main body portion, said push button protruding through said last mentioned throughbore.

8. In the device of claim 7 wherein said gripping portion includes a ring secured to said annular flange.

9. In the device of claim 1 wherein said gripping portion is T-shaped.

* * * * *